United States Patent [19]

Takahara et al.

[11] Patent Number: 4,806,822
[45] Date of Patent: Feb. 21, 1989

[54] CATHODE RAY TUBE CONTAINING ZINC SILICATE PHOSPHOR

[75] Inventors: Takeshi Takahara, Yokosuka; Tsutomu Ishii, Kawasaki; Mitsuhiro Oikawa, Yokohama, all of Japan

[73] Assignee: Kabushiki Kaisha Toshiba, Kawasaki, Japan

[21] Appl. No.: 124,364

[22] Filed: Nov. 23, 1987

Related U.S. Application Data

[63] Continuation of Ser. No. 899,326, Aug. 22, 1986, abandoned.

[30] Foreign Application Priority Data

Aug. 29, 1985 [JP] Japan ................... 60-188658

[51] Int. Cl.$^4$ ............................................. C09K 11/59
[52] U.S. Cl. ............................. 313/467; 252/301.6 F
[58] Field of Search ................. 252/301.6 F; 313/467

[56] References Cited

U.S. PATENT DOCUMENTS 4,231,892 11/1980 Chang et al. ................. 252/301.6 F

FOREIGN PATENT DOCUMENTS 834417 3/1952 Fed. Rep. of Germany .
151322 9/1983 Japan .

OTHER PUBLICATIONS

*Appl. Physics Letters*, 35(3), Aug. 1, 1979, pp. 229–231.
*The Electrochem. Soc.*, Spring Meeting (Minneapolis, Minn.) May 10–15, 1981, pp. 379–380.
*Extended Abstracts (vol. 86-2, Oct. 1986) for the Electrochemical Society*, Abstract No. 700 "New Green Phosphors . . . " by Takahara et al.

Primary Examiner—Jack Cooper
Attorney, Agent, or Firm—Oblon, Fisher, Spivak, McClelland & Maier

[57] ABSTRACT

Zinc silicate phosphor emitting green for cathode ray tubes with a long persistence, which does not contain arsenic.

| Formula $aZnO \cdot SiO_2 : Mn_x, In_y$ |
|---|
| in which the conditions $1.5 \leq a \leq 2$ |
| $5 \times 10^{-5} \leq x \leq 3 \times 10^{-2}$ |
| $1 \times 10^{-5} \leq y \leq 1 \times 10^{-2}$ | are satisfied.

4 Claims, 2 Drawing Sheets

CATHODE RAY TUBE CONTAINING ZINC SILICATE PHOSPHOR

This application is a continuation of application Ser. No. 899,326, filed on Aug. 22, 1986, now abandoned.

BACKGROUND OF THE INVENTION

This invention relates generally to zinc silicate phosphor for cathode ray tubes and, more particularly to green color-producing manganese activated zinc silicate phosphor.

Recently, there has been a requirement for the use of cathode ray tubes with high resolution for computer terminal display units, aircraft control system display units and the like, in which fine characters and graphic displays are used.

The phosphor screen of such high resolution cathode ray tubes must be composed of long persistence phosphor. When a cathode ray tube phosphor screen is composed of short persistence phosphor, flickering occurs on the screen, since the phosphor screen scanning speed is relatively slow. Generally, the phosphor composing the phosphor screen of such high resolution cathode ray tubes needs to have a long persistence time which is several tens to several hundreds of times longer than that of the short persistence phosphor of normal cathode ray tubes for TV. In this specification, the term "persistence time" means the time required for the luminescent brightness after cessation of excitation to fall to 10% of that at the time of excitation, that is to say, the 10% persistence time.

Hitherto, a manganese and arsenic activated zinc silicate phosphor (JEDEC No. P 39 phosphor) has been known as such a long persistence green color-producing phosphor. This phosphor is the most superior among the long persistence green colored phosphors known at present with respect to both luminescent brightness and persistence time, and it is used in great quantity.

However, in recent years, as the practical applications of cathode ray tubes have advanced, a longer persistence time than that of this P 39 phosphor has been required. The persistence of this P 39 phosphor is determined by the amount of arsenic activation. However, although the persistence time can be prolonged by increasing the arsenic activation, this is undesirable because of the problem of pollution (the toxicity of arsenic), and also because the brightness is reduced. Moreover, a phosphor which includes arsenic as an activator experiences the phenomenon called smear in which, initially, a weak persistence of 10% or less remains and causes a poor quality picture image in the cathode ray tube. For this reason, devices for prolonging persistence time without increasing the arsenic content have been disclosed in, for example, Japanese patent application Laid-Open No. 58-151322. In this disclosure, a phosphor with a long persistence was obtained, even though the amount of arsenic included is smal, by introducing antimony or bismuth into the phosphor with the arsenic. However, even with this device, arsenic, with its strong toxicity, was still included.

In prior art references, there is much research data regarding improvement of the persistence characteristics of phosphors. However, all of these references describe tubes with inadequate persistence and many are related to discharge lamps, which differ significantly from cathode ray tubes. Therefore, the prior art references were of no practical use in the achievement of this invention. For example, West German Pat. No. 834417 discloses that copper, silver, nickel, indium, cadmium and mercury may be introduced into a manganese activated zinc silicate phosphor. However, the reference relates to an ultraviolet excitation type phosphor for a gas-filled discharge lamp, which is very different from cathode ray tube phosphors. In fact, the typical phosphor described in this reference, in which the amount of $0.9 \times 10^{-4}$ wt % of silver as a co-activator was introduced into a manganese-activated zinc silicate phosphor was tested in a cathode ray tube. However, although, in the case of ultra-violet excitation the persistence characteristics improved (the persistence time became longer) compared with a phosphor in which the elements had not been introduced, this improvement of persistence characteristics was not observed in the case of electron beam excitation.

SUMMARY OF THE INVENTION

It is an object of this invention to provide an improved phosphor for cathode ray tubes which has a long persistence and a high brightness without the danger of environmental pollution.

According to this invention, the object is achieved by use a zinc silicate phosphor for cathode ray tubes comprising a composition essentially free of arsenic of the formula $aZnO \cdot SiO_2 : Mn_x, In_y$ wherein a is a number from about 1.5 to about 2, X is a number from about $5 \times 10^{-5}$ to about $3 \times 10^{-2}$, and y is a number from about $1 \times 10^{-5}$ to about $1 \times 10^{-2}$.

When y exceeds about $1 \times 10^{-2}$, the persistence time is not very long and the reduction of brightness is greater, and therefore this is not sufficient for practical use. As for the value x of the Mn activation amount, in the case of $x < 5 \times 10^{-5}$, the brightness reduces undesirably for practical use, while in the case of $x > 3 \times 10^{-2}$, there are problems in practical use because of brightness reduction and coloring of the phosphor. The most desirable range for x and y are $1 \times 10^{-3} \leq x \leq 1 \times 10^{-2}$ and $1 \times 10^{-4} \leq y \leq 5 \times 10^{-3}$, respectively.

Moreover, it is desirable that the ratio a of ZnO to $SiO_2$ in the parent material should be between 1.5 and 2. Outside this range the brightness reduction is too great.

These phosphors can prolong the persistence time without reducing brightness and, furthermore, they contain no arsenic (As) to cause undesirable environmental pollution. In this regard, small amounts below $1 \times 10^{-5}$ of As are not considered significant from an environmental standpoint.

BRIEF DESCRIPTION OF THE DRAWINGS

The accompanying drawings, which constitute a part of the specification, illustrate an embodiment of the invention, and together with the description, serve to explain the principles of the invention.

DETAILED DESCRIPTION OF THE PREFERRED EMBODIMENT

Figure 1:
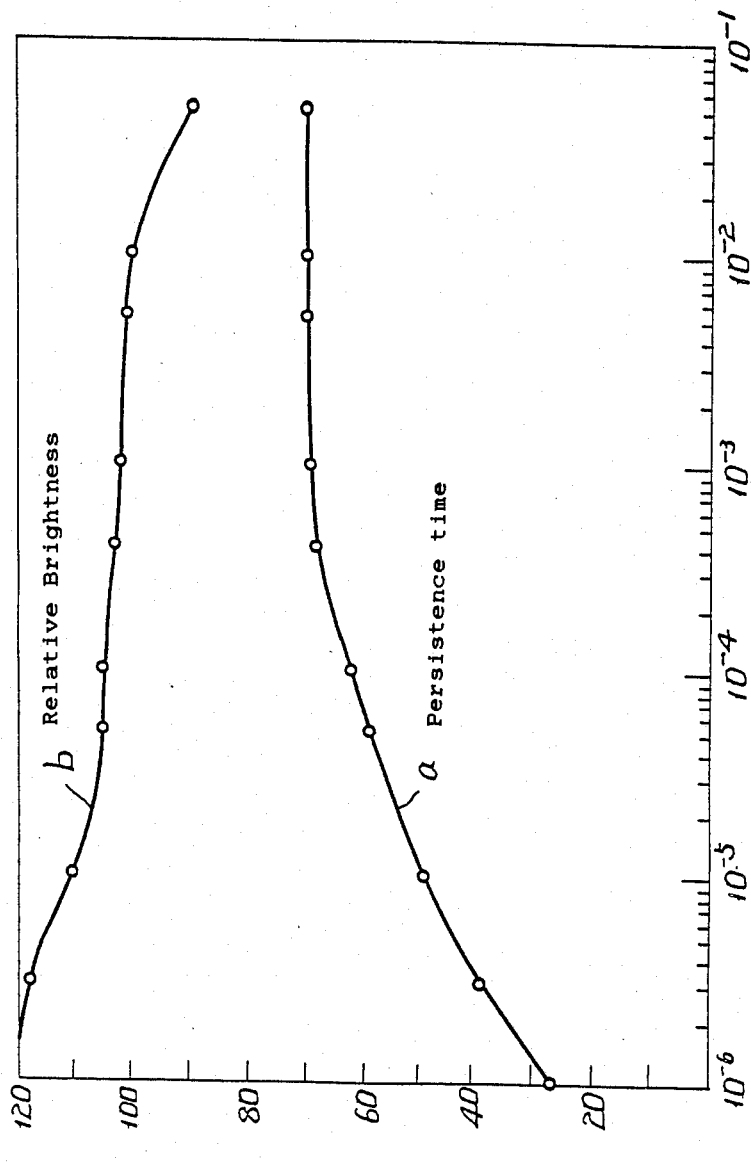
FIG. 1 is a graph showing the relationship between the consentration of indium activation in phosphors of this invention and their persistence times and brightnesses.

The phosphor of this invention is produced by the manufacturing method described below.

First, as raw material for the phosphor, (i) zinc oxide (ZnO) or a zinc compound which can be easily converted to ZnO by high temperature, such as a carbonate or an oxalate;
(ii) silicon dioxide (SiO$_2$) or a silicon compound which can be easily converted to SiO$_2$ by high temperature, such as ethyl silicate or silicic acid;
(iii) manganese oxide (MnO$_2$) or a manganese compound which can be easily converted to MnO$_2$ by high temperature, such as manganese metal, a carbonate, a halide, a nitrate or a sulphide, and
(iv) an oxide of indium or an indium compound which can be easily converted to an oxide of indium by high temperature, such as indium metal or a halide
are used.

As phosphors being finally obtained are expressed stiochiometrically as aZnO.SiO$_2$:Mn$_x$, In$_y$, the above phosphor raw materials are weighed so that a, x and y respectively satisfy the conditions $1.5 \leq a \leq 2$, $5 \times 10^{-5} \leq x \leq 3 \times 10^{-2}$ and $1 \times 10^{-5} \leq y \leq 1 \times 10^{-2}$. These are thoroughly mixed to prepare the phosphor raw material mixture. Mixing may be carried out by the dry method, using a ball mill, a mixer mill, a mortar or the like, or by the wet method, forming a paste using water, alcohol or a weak acid as a medium. Furthermore, a flux may also be added to the phosphor raw material mixture when producing the phosphor, with the object of improving the luminescent brightness and fine particle characteristics of phosphors which are obtained. Incidentally, since there is partial evaporation of raw material iv when fired at high temperature, a slightly greater quantity is added depending on the firing temperature and time.

Next, the phosphor raw material mixture is loaded into a heat resistant vessel such as an alumina crucible or a quartz crucible and firing is carried out. Firing is carried out once, or several times (3-4 times) in a neutral atmosphere, such as air (in an oxidizing atmosphere), nitrogen gas or argon gas, or in a reducing atmosphere such as nitrogen gas which contains a small amount of hydrogen gas or a carbon atmosphere, at a temperature of 1000° C. to 1350° C., and preferably 1200° C. to 1300° C. In addition, it is even more desirable if the above phosphor parent material is preliminarily fired at 500° C. to 1300° C. and parent material particle size growth is carried out. The firing time differs depending on the quantity of phosphor material mixture loaded in the heat resistant vessel and the firing temperature used, but generally 0.5 to 6 hours is suitable for the above firing temperature range, and 1 to 4 hours is preferable. After firing, the phosphor of this invention can be obtained by the processes generally used in the manufacture of phosphors, such as crushing the fired material, washing (washing may be carried out by water or other weak mineral acids, weak alkalis or weak organic acids), drying and sifting.

The improved P 39 type phosphor of this invention obtained by the above processing method exhibits a luminescent brightness almost equal to that of conventional P 39 phosphors and, in addition, the persistence time can be prolonged without the presence of any toxic and undesireable As content.

FIG. 1 shows the relationship between a 10% persistence time and the amount of In activation y in the case of a 1.75ZnO.SiO$_2$:Mn$_{0.008}$, In$_y$ phosphor of this invention. In FIG. 1, the 10% persistence time and brightness are taken as the vertical axis, and the In activation amount y is taken as the horizontal axis. Curve a shows the persistence characteristics and curve b shows the brightness characteristics (here, the brightness is relative to that of a conventional 1.85ZnO.SiO$_2$:Mn$_{0.008}$, As$_{0.002}$ phosphor which is taken as 100). As is clear from FIG. 1, when y is smaller than $1 \times 10^{-5}$, the brightness is high but the persistence time is undesirably short. Also, even when y exceeds $1 \times 10^{-2}$, the persistence time is still short and the reduction of brightness is greater. Therefore, this range of y is not sufficient for practical use. As for the value x of the Mn activation amount, in the case of $x < 5 \times 10^{-5}$, the brightness is too low for practical use, while in the case of $x > 3 \times 10^{-2}$, there are problems in practical use because of brightness reduction and coloring of the phosphor. The most desirable range for x and y are $1 \times 10^{-3} \leq 1 \times 10^{-2}$ and $1 \times 10^{-4} \leq y \leq 5 \times 10^{-3}$, respectively.

Moreover, it is desirable that the ratio a of ZnO to SiO$_2$ in the parent material should be between 1.5 and 2. Outside this range the brightness reduction is too great.

In this invention, part of the zinc may be replaced by magnesium, and part of the silicon by germanium. Also, very small amounts of lead, europium, phosphorous, boron, aluminium, beryllium and cadmium may be added. The following are detailed descriptions of several alternative embodiments.

Embodiments 1-5

The phosphor materials (1)-(5) shown below were weighed.

| | |
|---|---|
| Embodiment (1) | ZnO 650.96 g, SiO$_2$ 300.40 g, MnCO$_3$ 4.60 g, In$_2$O$_3$ 0.69 g. |
| Embodiment (2) | ZnO 732.33 g, SiO$_2$ 300.40 g, MnCO$_3$ 2.87 g, In$_2$O$_3$ 2.78 g. |
| Embodiment (3) | ZnO 773.02 g, SiO$_2$ 300.40 g, MnCO$_3$ 4.02 g, In$_2$O$_3$ 1.39 g. |
| Embodiment (4) | ZnO 711.99 g, SiO$_2$ 300.40 g, MnCO$_3$ 2.30 g, In$_2$O$_3$ 0.14 g. |
| Embodiment (5) | ZnO 793.36 g, SiO$_2$ 300.40 g, MnCO$_3$ 5.17 g, In$_2$O$_3$ 6.94 g. |

The above raw materials were thoroughly mixed in a ball mill. Then they were loaded into an alumina crucible and fired at 1300° C. for 2 hours in air. After firing, the fired material was crushed and mixed and then fired again for 2 hours at 1300° C. The fired materials obtained in this way were crushed and washed to give the phosphors of this invention shown in Table 1.

Figure 2:
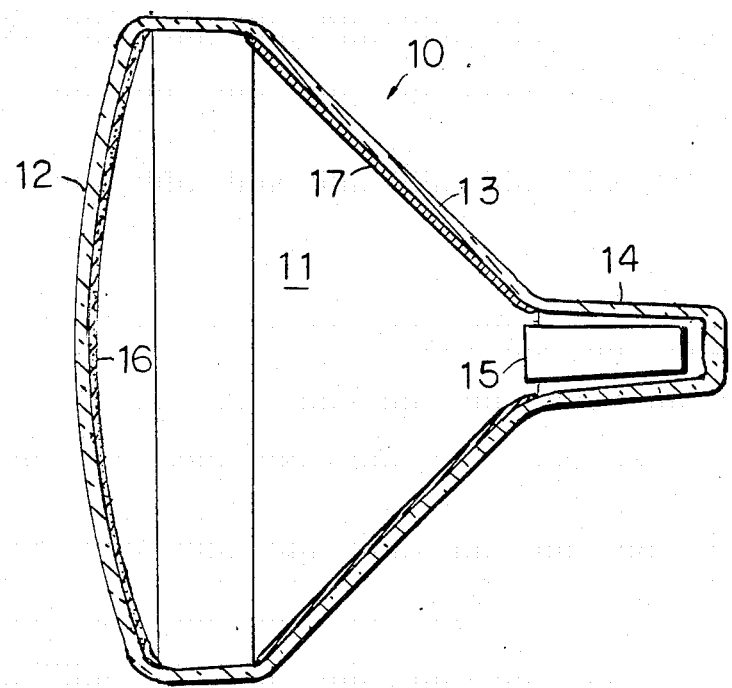
FIG. 2 is a cross-sectional view of an embodiment of this invention applied to a cathode ray tube.

These phosphors were respectively coated on a face plate 12 of a cathode ray tube 10 as shown in FIG. 2, and their characteristics were evaluated.

Cathode ray tube 10 has an evacuated envelope 11 composed of the face-plate 12, a funnel 13 and a neck 14 which houses an electron gun 15. A phosphor 16 was coated as a screen on the inner surface of face-plate 12 and a conductive film 17 was coated on the inner surface of funnel 13. The inside of envelope 11 was evacuated and a prescribed voltage was applied to the electrodes. An electron beam was emitted from electron gun 15 and phosphor 16 was excited and became luminescent. The results are shown in Table 1.

TABLE 1

| Embodiment No. | Formula | 10% Persistence (mSec) | Relative Brightness (%) | Smear |
|---|---|---|---|---|
| 1 | 1.6 ZnO SiO$_2$:Mn$_{0.008}$, In$_{0.0005}$ | 69 | 105 | No |
| 2 | 1.8 ZnO SiO$_2$:Mn$_{0.005}$, In$_{0.002}$ | 68 | 102 | " |
| 3 | 1.9 ZnO SiO$_2$:Mn$_{0.007}$, In$_{0.001}$ | 71 | 106 | " |

TABLE 1-continued

| Embodiment No. | Formula | 10% Persistence (mSec) | Relative Brightness (%) | Smear |
|---|---|---|---|---|
| 4 | 1.75 ZnO SiO$_2$:Mn$_{0.004}$, In$_{0.0001}$ | 61 | 105 | " |
| 5 | 1.95 ZnO SiO$_2$:Mn$_{0.009}$, In$_{0.005}$ | 70 | 101 | " |
| Conventional | 1.8 ZnO SiO$_2$:Mn$_{0.008}$, As$_{0.002}$ | 54 | 100 | Yes |

As is clear from Table 1, the phosphors of this invention have less smear, and are superior in persistence and luminescent brightness as compared to conventional phosphors containing arsenic.

As described above, the phosphors of this invention are most suitable as green luminescent components for green luminescent display tubes or color display tubes, because of their excellent persistence characteristic. While only a limited number of embodiments have been described, it is apparent that many other variations may be made in the particular design and configuration without departing from the scope of the invention as set forth in the appended claims.

We claim:

1. A cathode ray tube comprising an evacuated envelope, an electron excitation source and a screen containing a zinc silicate phosphor thereon, which consists essentially of a composition of the stoichiometric formula:

$$aZnO.SiO_2:Mn_x, In_y$$

which composition is substantially free of arsenic and wherein a is a number of from about 1.5 to about 2, x is a number of from about $5 \times 10^{-5}$ to about $3 \times 10^{-2}$, and y is a number of from about $1 \times 10^{-5}$ to about $1 \times 10^{-2}$.

2. The cathode ray tube of claim 1, wherein x is in the range of about $1 \times 10^{-3}$ to about $1 \times 10^{-2}$, and y is in the range of about $1 \times 10^{-4}$ to about $5 \times 10^{-3}$.

3. The cathode ray tube of claim 1, wherein a is about 1.9, x is about $7 \times 10^{-3}$ and y is about $1 \times 10^{-3}$.

4. The cathode ray tube of claim 1, wherein the composition is selected from the group of compositions having the following formulas:

1.6 ZnO.SiO$_2$: Mn$_{0.008}$, In$_{0.0005}$ 1.8 ZnO.SiO$_2$: Mn$_{0.005}$, In$_{0.002}$ 1.9 ZnO.SiO$_2$: Mn$_{0.007}$, In$_{0.001}$ 1.75 ZnO.SiO$_2$: Mn$_{0.004}$, In$_{0.0001}$ 1.95 ZnO.SiO$_2$: Mn$_{0.009}$, In$_{0.005}$.

* * * * *